US012601902B2

(12) United States Patent
Liu et al.

(10) Patent No.: US 12,601,902 B2
(45) Date of Patent: Apr. 14, 2026

(54) HIGH EFFECTIVE REFRACTIVE INDEX MATERIALS FOR ULTRA-HIGH RESOLUTION ILLUMINATION NANOSCOPY

(71) Applicant: The Regents of the University of California, Oakland, CA (US)

(72) Inventors: Zhaowei Liu, San Diego, CA (US); Yeon Ui Lee, San Diego, CA (US); Qian Ma, San Diego, CA (US); Junxiang Zhao, San Diego, CA (US)

(73) Assignee: The Regents at the University of California, Oakland, CA (US)

( * ) Notice: Subject to any disclaimer, the term of this patent is extended or adjusted under 35 U.S.C. 154(b) by 318 days.

(21) Appl. No.: 18/263,684

(22) PCT Filed: Feb. 4, 2022

(86) PCT No.: PCT/US2022/015322
§ 371 (c)(1),
(2) Date: Jul. 31, 2023

(87) PCT Pub. No.: WO2022/170102
PCT Pub. Date: Aug. 11, 2022

(65) Prior Publication Data
US 2024/0134178 A1 Apr. 25, 2024
US 2024/0231068 A9 Jul. 11, 2024

Related U.S. Application Data

(60) Provisional application No. 63/145,933, filed on Feb. 4, 2021.

(51) Int. Cl.
*G02B 21/06* (2006.01)
*G02B 1/00* (2006.01)
*G02B 21/36* (2006.01)

(52) U.S. Cl.
CPC ............. *G02B 21/06* (2013.01); *G02B 1/002* (2013.01); *G02B 21/365* (2013.01)

(58) Field of Classification Search
CPC ...... G02B 21/06; G02B 1/002; G02B 21/365; G02B 1/00; G02B 1/04; G02B 1/11;
(Continued)

(56) References Cited

U.S. PATENT DOCUMENTS

2011/0188032 A1* 8/2011 Verma ................... B82Y 20/00
359/586
2015/0317508 A1* 11/2015 Zheng ................. G02B 21/241
348/80
(Continued)

FOREIGN PATENT DOCUMENTS

CN 115128789 A * 9/2022 ......... G02B 21/0072

OTHER PUBLICATIONS

E. van Putten, D. Akbulut, J. Bertolotti, W. Vos, A. Lagendijk, A. Mosk, 'Scattering lens resolves sub-100 nm structures with visible light', Phys. Rev. Lett., 106, 193905, 2011. (Year: 2011).*
(Continued)

*Primary Examiner* — Arnel C Lavarias
(74) *Attorney, Agent, or Firm* — FisherBroyles, LLP

(57) ABSTRACT

A high effective refractive index structure may include one or more high effective refractive index materials disposed on a substrate. The high effective refractive index structure configured to respond to a light received at the high effective refractive index structure by at least generating one or more sub-diffraction limit illumination patterns for illuminating a specimen while one or more frames are captured of the illuminated specimen. The one or more sub-diffraction limit illumination patterns may include one or more speckle patterns. The one or more high effective refractive index materials may exhibit an effective refractive index equal to
(Continued)

or greater than 3. Examples of high effective refractive index materials include hyperbolic metamaterial (HMM) multilayers, nanowire based hyperbolic metamaterials, and organic hyperbolic materials (OHM).

18 Claims, 17 Drawing Sheets

(58) Field of Classification Search
    CPC ........................ G02B 5/18; G02B 2005/1804;
                G02B 5/1866; G02B 5/189; G02B 5/28;
                G02B 5/285; G02B 5/286; G02B 5/287;
                    G02B 21/00; G02B 21/0004; G02B
                                27/48; G02B 27/42
    USPC ....... 359/558, 566, 569, 576, 577, 580, 581,
                359/586, 588, 589, 590, 585, 362, 363,
                                    359/368, 369, 385
    See application file for complete search history.

(56)                    References Cited

U.S. PATENT DOCUMENTS

| 2019/0339449 A1 | 11/2019 | Shipton et al. |
| 2020/0303900 A1 | 9/2020 | Yun |
| 2020/0340798 A1 | 10/2020 | Izatt et al. |

OTHER PUBLICATIONS

Agarwal, K. et al., "Multiple Signal Classification Algorithm for Super-Resolution Fluorescence Microscopy." Nat. Commun. 7, 13752 (2016).
Blau, Y. et al., "Double Moire Structured Illumination Microscopy with High-Index Materials." Opt. Lett. 41, 3455 (2016).
Chen, B.-C. et al., "Lattice Light-Sheet Microscopy: Imaging Molecules to Embryos at High Spatiotemporal Resolution." Science 346, 1257998 (2014).
Chung, E. et al., "Extended Resolution Wide-Field Optical Imaging: Objective-Launched Standing-Wave Total Internal Reflection Fluorescence Microscopy." Opt. Lett. 31, 945 (2006).
Dertinger, T. et al., "Fast, Background-Free, 3D Super-Resolution Optical Fluctuation Imaging (SOFI)." Proc. Natl. Acad. Sci. 106, 22287-22292 (2009).
Diekmann, R. et al., "Chip-Based Wide Field-of-View Nanoscopy." Nat. Photonics 11, 322-328 (2017).
Garcia, N. et al., "Monte Carlo Calculation for Electromagnetic-Wave Scattering from Random Rough Surfaces." Phys. Rev. Lett. 52, 1798-1801 (1984).
Gustafsson, M. G. L., "Nonlinear Structured-Illumination Microscopy: Wide-Field Fluorescence Imaging with Theoretically Unlimited Resolution." Proc. Natl. Acad. Sci. 102, 13081-13086 (2005).
Gustafsson, M. G. L., "Surpassing the Lateral Resolution Limit by a Factor of Two Using Structured Illumination Microscopy." J. Microsc. 198, 82-7 (2000).
Hell, S. W. et al., "Breaking the Diffraction Resolution Limit by Stimulated Emission: Stimulated-Emission-Depletion Fluorescence Microscopy." Opt. Lett. 19, 780 (1994).
Hell, S. W. et al., "Ground-State-Depletion Fluorscence Microscopy: A Concept for Breaking the Diffraction Resolution Limit." Appl. Phys. B Lasers Opt. 60, 495-497 (1995).
Hess, S. T. et al., "Ultra-High Resolution Imaging by Fluorescence Photoactivation Localization Microscopy." Biophys. J. 91, 4258-4272 (2006).

Hofmann, M. et al., "Breaking the Diffraction Barrier in Fluorescence Microscopy at Low Light Intensities by Using Reversibly Photoswitchable Proteins." Proc. Natl. Acad. Sci. 102, 17565-17569 (2005).
Jang, M. et al., "Wavefront Shaping with Disorder-Engineered Metasurfaces." Nat. Photonics 12, 84-90 (2018).
Johnson, P. B. et al., "Optical Constants of the Noble Metals." Phys. Rev. B 6, 4370-4379 (1972).
Kim, MK. et al., "Superresolution Imaging with Optical Fluctuation Using Speckle Patterns Illumination." Sci. Rep. 5, 16525 (2015).
Lee, Y. U. et al., "Low-Loss Organic Hyperbolic Materials in the Visible Spectral Range: A Joint Experimental and First-Principles Study." Adv. Mater. 32, 2002387 (2020).
Lee, Y. U. et al., "Organic Monolithic Natural Hyperbolic Material." ACS Photonics 6, 1681-1689 (2019).
Li, D. et al., "Extended-Resolution Structured Illumination Imaging of Endocytic and Cytoskeletal Dynamics." Science 349, aab3500 (2015).
Liu, X. et al., "Fluorescent Nanowire Ring Illumination for Wide-Field Far-Field Subdiffraction Imaging." Phys. Rev. Lett. 118, 076101 (2017).
Ma, Q. et al., "Super-Resolution Imaging by Metamaterial-Based Compressive Spatial-To-Spectral Transformation." Nanoscale 9, 18268-18274 (2017).
Mudry, E. et al., Structured Illumination Microscopy Using Unknown Speckle Patterns. Nat. Photonics 6, 312-315 (2012).
Narimanov, E. E. et al., "Naturally Hyperbolic." Nat. Photonics 9, 214-216 (2015).
Narimanov, E. E., "Hyperstructured Illumination." ACS Photonics 3, 1090-1094 (2016).
Nieuwenhuizen, R. P. J. et al., "Measuring Image Resolution in Optical Nanoscopy." Nat. Methods 10, 557-562 (2013).
Park, C. et al., "Full-Field Subwavelength Imaging Using a Scattering Superlens." Phys. Rev. Lett. 113, 113901 (2014).
Patterson, G. et al., "Superresolution 17 Imaging using Single-Molecule Localization." Annu. Rev. Phys. Chem. 61, 345-367 (2010).
Ponsetto, J. L. et al., "Experimental Demonstration of Localized Plasmonic Structured Illumination Microscopy." ACS Nano 11, 5344-5350 (2017).
Ponsetto, J. L. et al., "Localized Plasmon Assisted Structured Illumination Microscopy for Wide-Field High-Speed Dispersion-Independent Super Resolution Imaging." Nanoscale 6, 5807-5812 (2014).
Rust, M. J. et al., "Sub-Diffraction-Limit Imaging by Stochastic Optical Reconstruction Microscopy (STORM)." Nat. Methods 3, 793-796 (2006).
Wei, F. et al., "Plasmonic Structured Illumination Microscopy." Nano Lett. 10, 2531-2536 (2010).
Wei, F. et al., "Wide Field Super-Resolution Surface Imaging through Plasmonic Structured Illumination Microscopy." Nano Lett. 14, 4634-4639 (2014).
Wei, S. et al., "Sub-100nm Resolution PSIM by Utilizing Modified Optical Vortices with Fractional Topological Charges for Precise Phase Shifting." Opt. Express 23, 30143 (2015).
Wood, B. et al., "Directed Subwavelength Imaging Using a Layered Metal-Dielectric System." Phys. Rev. B 74, 115116 (2006).
Yahiatene, I. et al., "Entropy-Based Super-Resolution Imaging (ESI): From Disorder to Fine Detail." ACS Photonics 2, 1049-1056 (2015).
Yilmaz, H. et al., "Speckle Correlation Resolution Enhancement of Wide-Field Fluorescence Imaging." Optica 2, 424 (2015).

* cited by examiner

100

Light Source 110

High Refractive Index Structure 150

| Substrate 155 |
| High Coupling Efficiency Material 165 |
| High Refractive Index Material 153 |
| Spacer 163 |

Specimen 130

Protective Structure 160

Light Detector 120

High Refractive
Index Structure
150

Specimen 130

Light Detector 120

HIGH EFFECTIVE REFRACTIVE INDEX MATERIALS FOR ULTRA-HIGH RESOLUTION ILLUMINATION NANOSCOPY

CROSS REFERENCE TO RELATED APPLICATION

This application is a national stage entry of Patent Cooperation Treaty Application No. PCT/US2022/015322 filed Feb. 4, 2022, entitled "HIGH EFFECTIVE REFRACTIVE INDEX MATERIALS FOR ULTRA-HIGH RESOLUTION ILLUMINATION NANOSCOPY," which claims priority to U.S. Provisional Application No. 63/145,933 filed Feb. 4, 2021, entitled "METAMATERIAL ASSISTED SPECKLE ILLUMINATION NANOSCOPY," the disclosures of which are incorporated herein by reference in their entirety.

TECHNICAL FIELD

The subject matter described herein relates generally to optics and more specifically to high effective refractive index materials for enhancing the resolution of illumination nanoscopy.

BACKGROUND

Structured illumination microscopy (SIM) is a widefield technique in which a series of illumination patterns are generated and superimposed onto a specimen while images of the illuminated specimen are captured. Images beyond the diffraction limit can be obtained by using a reconstruction algorithm. Compared with other super-resolution approaches such as single molecule localization based methods (e.g., photoactivated localization microscopy (PALM) and stochastic optical reconstruction microscopy (STORM)) or reversible saturable optical linear fluorescence transitions (RESOFT) microscopy (e.g., stimulated emission depletion (STED) and ground state depletion (GSD) microscopy), structured illumination microscopy demonstrates supreme advantages by providing high spatial-temporal resolution with low photo-toxicity.

SUMMARY

Systems, methods, and articles of manufacture, including optical instruments, are provided for ultra-high resolution illumination nanoscopy. In one aspect, there is provided an apparatus that includes: a high effective refractive index structure including one or more high effective refractive index materials disposed on a substrate, the high effective refractive index structure configured to respond to a light received at the high effective refractive index structure by at least generating one or more sub-diffraction limit illumination patterns for illuminating a specimen while one or more frames are captured of the illuminated specimen In some variations, one or more features disclosed herein including the following features can optionally be included in any feasible combination. The one or more sub-diffraction limit illumination patterns may include one or more speckle patterns.

In some variations, the one or more high effective refractive index materials may exhibit an effective refractive index equal to or greater than 3

In some variations, the one or more high effective refractive index materials may include a hyperbolic metamaterial (HMM) multilayer.

In some variations, the hyperbolic metamaterial multilayer may includes one or more pairs of a first material coupled with a second material.

In some variations, the hyperbolic metamaterial multilayer may include one or more pairs of a metal layer coupled with a dielectric layer.

In some variations, the hyperbolic metamaterial multilayer may include a silver (Ag) and silicon dioxide ($SiO_2$) multilayer.

In some variations, the one or more high effective refractive index materials may include a nanowire based hyperbolic metamaterial (HMM).

In some variations, the one or more high effective refractive index materials may include an organic hyperbolic material (OHM).

In some variations, the organic hyperbolic material may include regioregular poly(3-hexylthiophene-2,5-diyl) (P3HT).

In some variations, the apparatus may further include a light source configured to output the light. The light source may include a laser, a light emitting diode (LED), and/or a lamp.

In some variations, the apparatus may further include one or more mechanisms configured to direct, to the high effective refractive index structure, at least a portion of the light output by the light source.

In some variations, the one or more mechanisms may include a multimode fiber and/or a spatial light modulator.

In some variations, the apparatus may further include an image sensor configured to generate the one or more frames of the illuminated specimen.

In some variations, the image sensor may include a light detector configured to detect light transmitted through and/or reflected from the illuminated specimen.

In some variations, the image sensor may include one or more of active pixel sensors, charge-coupled devices (CCD), radiation detectors, infrared detectors, light emitting diodes, photoresistors, photodiodes, phototransistors, pinned photodiodes, quantum dot photoconductors or photodiodes, semiconductor detectors, silicon drift detectors (SDD), a complementary metal-oxide-semiconductor (CMOS) camera, a scientific complementary metal-oxide-semiconductor (sCMOS) camera, and a photomultiplier tube (PMT) array.

In some variations, the apparatus may further include at least one of (i) a spacer interposed between the one or more high effective refractive index materials and the specimen and (ii) a high coupling efficiency material interposed between the one or more high effective refractive index materials and the substrate.

In some variations, the apparatus may further include at least one data processor and at least one memory storing instructions that result in operations when executed by the at least one data processor. The operations may include: applying a reconstruction technique to generate, based at least on the one or more frames, one or more images of the specimen.

In some variations, the reconstruction technique may include a deep learning model, blind structured illumination microscopy (blind-SIM), super-resolution optical fluctuation imaging (SOFI), electrical source imaging (ESI), and/or multiple signal classification algorithm (MUSICAL).

In some variations, the specimen may include a biological sample and/or a biochemical sample.

In another aspect, there is provided an apparatus that includes: a high effective refractive index structure including one or more high effective refractive index materials disposed on a substrate, the high effective refractive index structure configured to respond to a light received at the high effective refractive index structure by at least generating one or more sub-diffraction limit illumination patterns for illuminating a specimen while one or more frames are captured of the illuminated specimen; a light source configured to output the light received at the high effective refractive index structure; and an image sensor configured to generate the one or more frames of the illuminated specimen.

In some variations, one or more features disclosed herein including the following features can optionally be included in any feasible combination. The one or more sub-diffraction limit illumination patterns may include one or more speckle patterns.

In some variations, the one or more high effective refractive index materials may exhibit an effective refractive index equal to or greater than 3

In some variations, the one or more high effective refractive index materials may include a hyperbolic metamaterial (HMM) multilayer.

In some variations, the hyperbolic metamaterial multilayer may includes one or more pairs of a first material coupled with a second material.

In some variations, the hyperbolic metamaterial multilayer may include one or more pairs of a metal layer coupled with a dielectric layer.

In some variations, the hyperbolic metamaterial multilayer may include a silver (Ag) and silicon dioxide ($SiO_2$) multilayer.

In some variations, the one or more high effective refractive index materials may include a nanowire based hyperbolic metamaterial (HMM).

In some variations, the one or more high effective refractive index materials may include an organic hyperbolic material (OHM).

In some variations, the organic hyperbolic material may include regioregular poly(3-hexylthiophene-2,5-diyl) (P3HT).

In some variations, the light source may include a laser, a light emitting diode (LED), and/or a lamp.

In some variations, the apparatus may further include one or more mechanisms configured to direct, to the high effective refractive index structure, at least a portion of the light output by the light source.

In some variations, the one or more mechanisms may include a multimode fiber and/or a spatial light modulator.

In some variations, the image sensor may include a light detector configured to detect light transmitted through and/or reflected from the illuminated specimen.

In some variations, the image sensor may include one or more of active pixel sensors, charge-coupled devices (CCD), radiation detectors, infrared detectors, light emitting diodes, photoresistors, photodiodes, phototransistors, pinned photodiodes, quantum dot photoconductors or photodiodes, semiconductor detectors, silicon drift detectors (SDD), a complementary metal-oxide-semiconductor (CMOS) camera, a scientific complementary metal-oxide-semiconductor (sCMOS) camera, and a photomultiplier tube (PMT) array.

In some variations, the apparatus may further include at least one of (i) a spacer interposed between the one or more high effective refractive index materials and the specimen and (ii) a high coupling efficiency material interposed between the one or more high effective refractive index materials and the substrate.

In some variations, the apparatus may further include at least one data processor and at least one memory storing instructions that result in operations when executed by the at least one data processor. The operations may include: applying a reconstruction technique to generate, based at least on the one or more frames, one or more images of the specimen.

In some variations, the reconstruction technique may include a deep learning model, blind structured illumination microscopy (blind-SIM), super-resolution optical fluctuation imaging (SOFI), electrical source imaging (ESI), and/or multiple signal classification algorithm (MUSICAL).

In some variations, the specimen may include a biological sample and/or a biochemical sample.

In another aspect, there is provided a method for ultra-high resolution illumination nanoscopy. The method may include: generating, by a high effective refractive index structure including one or more high effective refractive index materials disposed on a substrate, one or more sub-diffraction limit illumination patterns, the high effective refractive index structure generating the one or more sub-diffraction limit illumination patterns in response to a light received at the high effective refractive index structure; illuminating a specimen with the one or more sub-diffraction limit illumination patterns; and capturing one or more frames of the illuminated specimen.

In some variations, one or more features disclosed herein including the following features can optionally be included in any feasible combination. The method may further include: applying, using at least one data processor, a reconstruction technique to generate, based at least on the one or more frames, one or more images of the specimen, the reconstruction technique including a deep learning model, blind structured illumination microscopy (blind-SIM), super-resolution optical fluctuation imaging (SOFT), electrical source imaging (ESI), and/or multiple signal classification algorithm (MUSICAL).

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to illumination nanoscopy, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
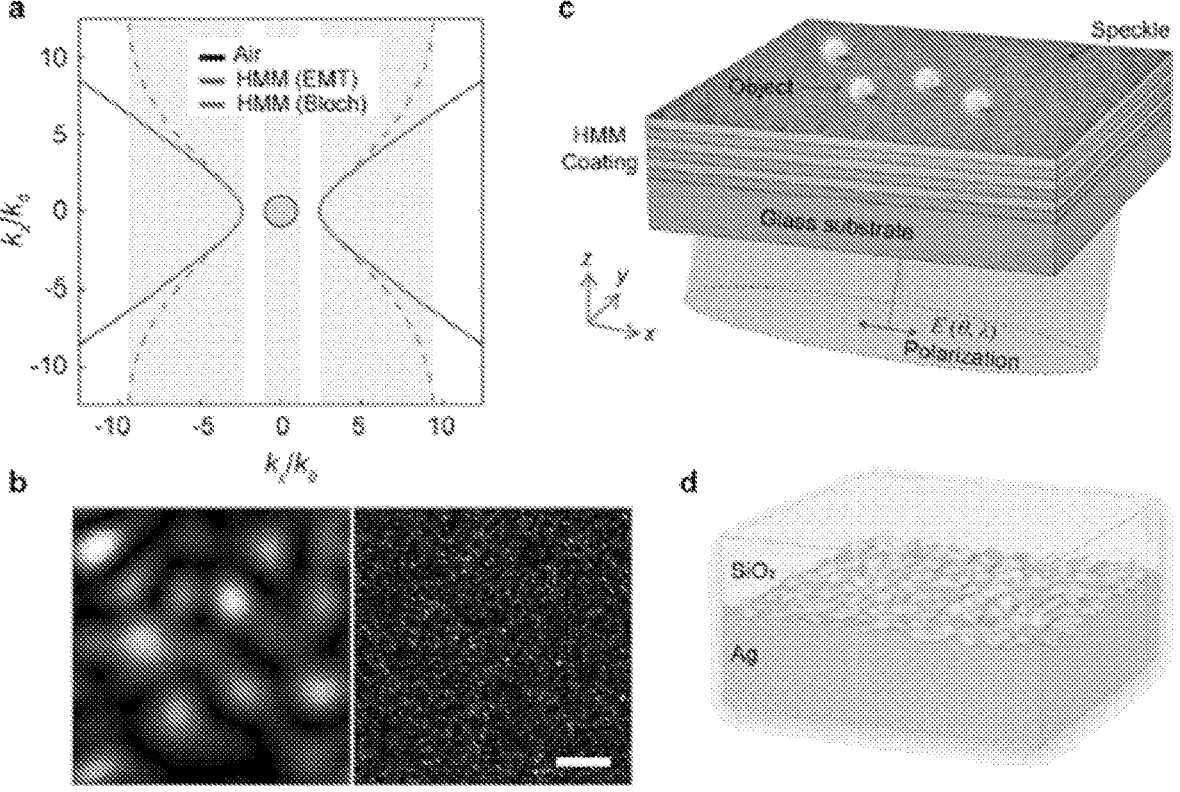
FIG. 1 depicts an example of metamaterial assisted speckle illumination. a. Isofrequency curve of air, an ideal HMI by effective medium theory (EMT), and a practical FIMM consists of periodical layered structures of Ag and $SiO_2$ (Bloch) at wavelength of 488 mit The wave vector $k_o$ and $k_z$ are both nommlized to the wave vector in air $k_o$. The allowed k-bandwidth is highlighted in gray (air) and in orange (practical TIMM). b. Calculated exemplary speckle patterns (normalized intensity) from different material systems. Left: diffraction limited speckle (gray bandwidth in (a)); Right: HMM assisted speckle (yellow bandwidth in (a)). Scale bar: 400 run. c. A MANN coated substrate projects ultra-fine structured speckles onto objects lying on its top surface. d. Schematics of the non-uniform interface between sputtered Ag and $SiO_2$ interface.

When practical, like labels are used to refer to same or similar items in the drawings.

DETAILED DESCRIPTION

Structured illumination microscopy (SIM) is one of the most powerful and versatile optical super-resolution techniques. Compared with other super-resolution methods, structured illumination microscopy provides unique advantages in wide-field imaging such as high temporal resolution and low photon damage. Nevertheless, the resolution of conventional structured illumination microscopy is limited by its highest attainable spatial frequency f which, as Equation (1) below shows, corresponds to the maximum spatial frequencies associated with illumination and detection.

$$f = f_{det} + f_{illum} \qquad (1)$$

wherein $f_{det}$ and $f_{illum}$ denotes the maximum spatial frequencies of the detection optics and illumination patterns, respectively. By using far-field optics, illumination and detection are diffraction-limited. As such, conventional structured illumination microscopy achieves merely a twofold spatial resolution improvement compared to the diffraction limit.

Efforts to improve the resolution of structured illumination microscopy include extending the spatial-frequency $f_{illum}$ of illumination patterns. For example, nonlinear structured illumination microscopy, by saturated excitation of fluorophores, can utilize higher order harmonics and access much larger spatial-frequencies $f_{illum}$. However, this increase in the spatial-frequency $f_{illum}$ of illumination patterns is achieved through much stronger laser intensity, which is inevitably associated with significant phototoxicity and photobleaching. The resolution of illumination patterns can also be increased by the substrate material if the specimen is illuminated by an evanescent wave. In this case, however, only specimens on the substrate surface can be imaged.

In some example embodiments, an optical instrument, such as a microscope, may incorporate a high effective refractive index structure including one or more high effective refractive index materials disposed on a substrate. The one or more high effective refractive index materials may include materials having an effective refractive index in excess of 3. Examples of high effective refractive index materials include multilayer hyperbolic metamaterials (e.g., metal/dielectric multilayers and/or the like), nanowire based hyperbolic metamaterials, and organic hyperbolic materials (OHM) (e.g., regioregular poly(3-hexylthiophene-2,5-diyl) (P3HT) and/or the like). The high effective refractive index structure may be configured to generate speckle-like sub-diffraction limit illumination patterns in the near field with improved spatial frequency.

As used herein, methods, systems, and apparatuses incorporating the high effective refractive index structure may be referred to as speckle metamaterial-assisted illumination nanoscopy (speckle-MAIN). The sub-diffraction limit illumination patterns associated with speckle metamaterial-assisted illumination nanoscopy (speckle-MAIN) may be superimposed onto a specimen to achieve a resolution in excess of 40 nanometers. For example, speckle metamaterial-assisted illumination nanoscopy (speckle-MAIN) is able to resolve two-beads with center-to-center resolution of about 40 nanometer while remaining a relatively simple, mass-producible sample preparation method. Because the illumination pattern is mainly enabled by the high effective refractive index structure, optical systems and apparatus incorporating the high effective refractive index structure may remain structurally uncomplicated. For example, in some example embodiments, super-high resolution images may be acquired using an optical instrument that includes a light source, a light detector, and the high effective refractive index structure.

Compared to traditional structured illumination microscopy, speckle-MAIN greatly extends the spatial resolution with the minimal cost of an increased number of measurements. Compared to localization techniques like PALM/STORM, speckle-MAIN has the advantage of lower incident power and fewer number of frames. Note that speckle-MAIN does not solely rely on the blind structured illumination microscopy (SIM) reconstruction and several other reconstruction methods, such as deep learning models (e.g., neural networks and/or the like), super-resolution optical fluctuation imaging (SOFI), electrical source imaging (ESI), and multiple signal classification algorithm (MUSICAL), can also be used to further improve the image quality, imaging speed and resolution. Furthermore, additional prior information of the object can be combined with the pre-determined illumination information to increase the imaging speed dramatically. Contrary to other fluctuation based super-resolution techniques, the generated super-resolution speckle patterns in speckle-MAIN can be replicated under the exact same illumination condition. The deterministic nature of the speckle enables more prior information for image reconstruction given the known nanostructures in the substrate of the high effective refractive index structure. The resolution of speckle-MAIN is mainly limited by the high effective refractive index materials forming the high effective refractive index structure. These limitation may arise, for example, from the unit pair size of the hyperbolic metamaterial multilayers, the quality of the interfaces, and volumetric scatters.

Figure 18A:
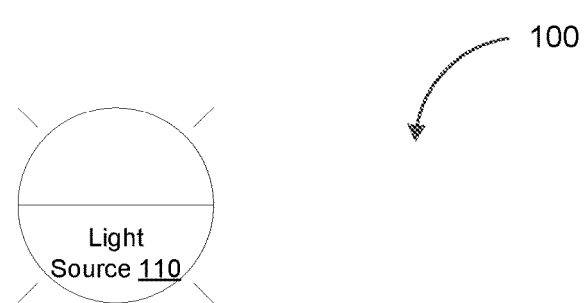
FIG. 18A depicts a schematic diagram illustrating an example of an optical instrument incorporating a high effective refractive index structure, in accordance with some example embodiments.
Figure 18A:
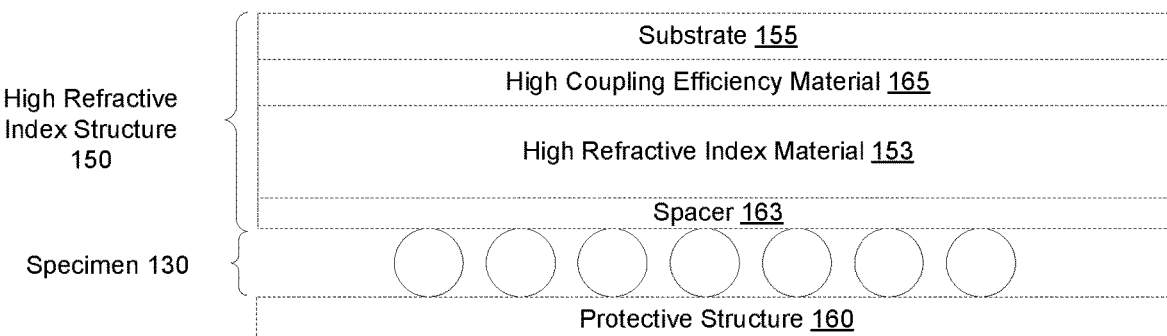
Figure 18A:
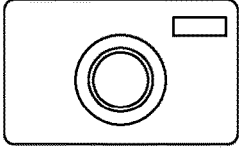
Figure 18B:
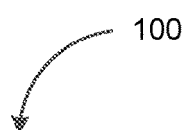
FIG. 18B depicts another example of an optical instrument incorporating a high effective refractive index structure, in accordance with some example embodiments.
Figure 18B:
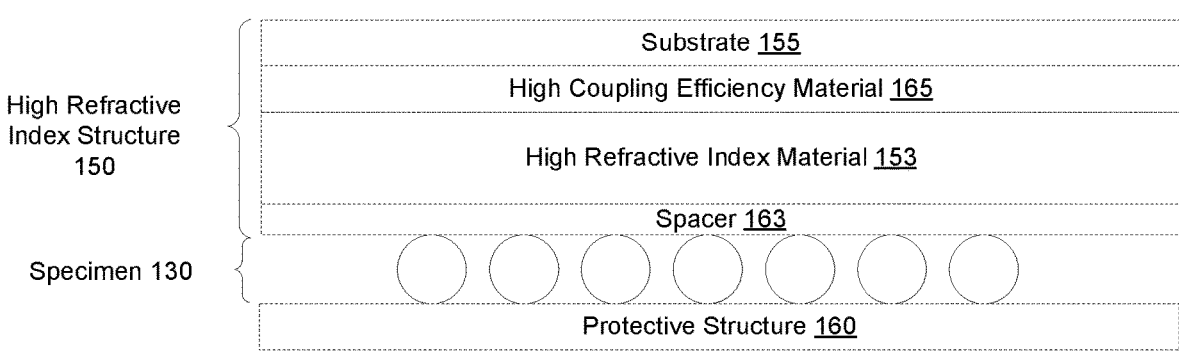
Figure 18B:
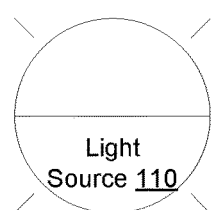
Figure 18B:
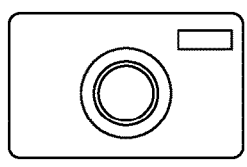

FIGS. 18A-B depict examples of an optical instrument 100 that incorporates an high effective refractive index structure 150, in accordance with some example embodiments. The high effective refractive index structure 150 may include one or more high effective refractive index materials 153 disposed on top of a substrate 155 (e.g., glass and/or the like). As shown in FIGS. 18A-B, the high effective refractive index structure 150 may include one or more single layers of the high effective refractive index materials 153 disposed on one side of the substrate 155. Moreover, FIGS. 18A-B show that one or more layers of a high coupling efficiency material 165 may be interposed between the high effective refractive index materials 153 and the substrate 155. The high coupling efficiency material 165 may be configured to increase the transfer of optical power between the light source 110 and the high effective refractive index material 153. Examples of the high coupling efficiency material 165 may include particles of a first material (e.g., a metal) dispersed randomly within a medium of a second material, thus increasing the intensity of the light from the light source 110 that is received by the high effective refractive index material 153 for conversion to super resolution illumination patterns.

The one or more high effective refractive index materials 153 may exhibit an effective refractive index of 3 or greater. Examples of the one or more high effective refractive index materials 153 include hyperbolic metamaterial (HMM) multilayers (e.g., metal/dielectric multilayers and/or the like), nanowire based hyperbolic metamaterials, and organic hyperbolic materials (OHM) (e.g., regioregular poly(3-hexylthiophene-2,5-diyl) (P3HT) and/or the like). As shown in FIGS. 18A-B, the optical instrument 100 may also include the light source 110 and a light detector 120. Examples of the light source 110 include a laser (e.g., a continuous wave (CW) laser), a light emitting diode (LED), a lamp, and/or the like. Examples of the light detector 120 include active pixel sensors, charge-coupled devices (CCD), radiation detectors, infrared detectors, light emitting diodes, photoresistors, photodiodes, phototransistors, pinned photodiodes, quantum dot photoconductors or photodiodes, semiconductor detectors, and silicon drift detectors (SDD). The light detector 120 may be a part of an image sensor including, for example, a focal plane array (FPA) such as a complementary metal-oxide-semiconductor (CMOS) camera, a scientific complementary metal-oxide-semiconductor (sCMOS) camera, a charge-coupled device (CCD) camera, an electron multiplying charge-coupled device (EMCCD) camera, or a photomultiplier tube (PMT) array.

It should be appreciated that the optical instrument 100 may include one or more mechanisms, such as diffusers or collimators, to direct light output by the light source 110 to the high effective refractive index structure 150. These mechanisms may also introduce irregular patterns to form irregular patterns, such as speckle patterns, for illuminating a sample 130. Examples of such mechanisms include a fiber and a spatial light modulator (e.g., a digital mirror device (DMD), a liquid crystal spatial light modulator, and/or the like). The fiber, such as a multimode fiber, may generate the random illumination pattern may through interference effect with random and tunable phases (e.g., vibrate the fiber using a motor).

In some example embodiments, the high effective refractive index structure 150 may be configured to respond to light from the light source 110 by generating one or more sub-diffraction limit illumination patterns for illuminating the specimen 130 disposed, for example, upon the high effective refractive index structure 150. In some cases, the specimen 130 may be interposed between the high effective refractive index structure 150 and a protective structure 160, such as a cover glass and/or the like. The specimen 130 may be disposed directly on the surface of the high effective refractive index material 153. Alternatively, a spacer 163 may be interposed between the specimen 130 and the high effective refractive index material 153 such that the specimen 130 is not in direct contact with the surface of the high effective refractive index material 153. The thickness of the spacer 163 may vary depending on application, for example, between 0 nanometers to 200 nanometers. The spacer 163 may protect the high effective refractive index material 153 from degradation caused by environmental exposure (e.g., oxidation and/or the like). Moreover, by preventing direct contact between the specimen 130 and the high effective refractive index material 153, the spacer 130 may also prevent contamination by and other undesirable interactions between the specimen 130 and the high effective refractive index material 153.

As noted, the light detector 120 may be a part of an image sensor, which may capture one or more frames of the specimen 130 while the specimen 130 is illuminated by the one or more sub-diffraction limit illumination patterns generated by the high effective refractive index structure 150. FIG. 18A depicts the optical instrument 100 in a configuration to operate in a transmission mode while FIG. 18B depicts the optical instrument 100 in a configuration to operate in a reflection mode. For example, in the example of the light instrument 100 shown in FIG. 18A, the light detector 120 may detect light transmitted through the specimen 130 in response to being illuminated by the one or more sub-diffraction limit illumination patterns generated by the high effective refractive index structure 150. Alternatively, in the example of the optical instrument 100 shown in FIG. 18B, the light detector 120 may detect light reflected by the specimen 130 in response to being illuminated by the one or more sub-diffraction limit illumination patterns generated by the high effective refractive index structure 150.

High effective refractive index materials, such as the one or more high effective refractive index materials 153 forming the high effective refractive index structure 150, benefiting from their anisotropic hyperbolic isofrequency curve, are capable of carrying much higher spatial frequency contents than most materials that can be found in nature. FIG. 1($a$) depicts a comparison of the isofrequency curves of air, an "ideal hyperbolic metamaterial (HMM), and a practical hyperbolic metamaterial (HMM) multilayer. The ideal hyperbolic metamaterial has an unlimited k-space, while a practical hyperbolic metamaterial, such as a silver and silicon oxide (Ag—SiO$_2$) multilayer, exhibits a k-space limitation from its periodicity. A multilayer with a smaller period of alternating layers may therefore support a higher spatial frequency. A practically achievable hyperbolic metamaterial multilayer (e.g., a silver and silicon oxide (Ag/SiO$_2$) multilayer) with a period of 20 nanometers may support a highest k mode of approximately $10k_0$ working at the 488 nanometer wavelength. Speckle patterns, as a result of multi-beam interference of the waves through the hyperbolic metamaterial, will have their resolution enhanced by the enlarged k bandwidth, as shown in FIG. 1($b$).

In FIG. 1(d), it is shown that the intrinsic surface scattering as well as volumetric scattering caused by non-perfect multilayers may be used to convert the incident plane wave to high k vector waves and generate ultra-high resolution speckle on the top surface. Compared to the subwavelength near-field speckle patterns generated by using random nanoparticles, the hyperbolic metamaterial (HMM) produced speckles possess a much higher resolution. The high-resolution speckle patterns can also be translated or modified by changing the incident angles and wavelengths as shown in FIG. 1(c).

Figure 2:
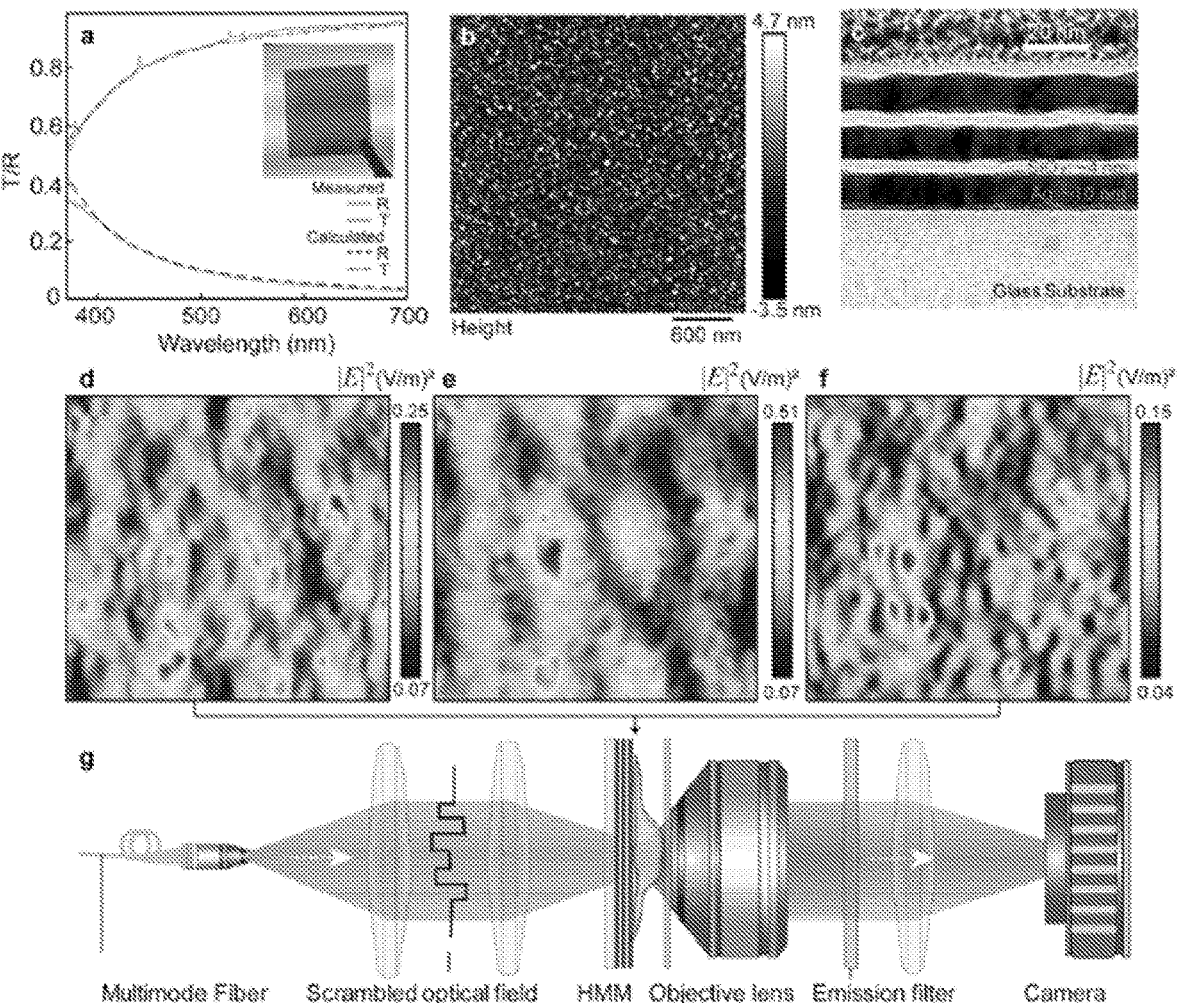
FIG. 2 depicts the characterization and simulation of an example of a multilayer hyperbolic metamaterial (HMI). a. Transmittance (1) and reflectance (R) at normal incidence of the Ag—$SiO_2$ multilayer HMM. Inset image: a photo of the HMM-coated cover glass. Calculation is done based on transfer matrix method for 3 pairs of (10 nm Ag and 4 am $SiO_2$) on glass. b. AFM image of the top surface. Scan area: 3 $\mu$m×3 $\mu$m (512 pixels×512 pixels). c. TEM cross-section shows 3 pairs of 10 nmAg and 4 nm $SiO_2$ on top of a glass substrate with Cr adhesion layer d-f. Simulated light intensities ($|E|^2$) on x-y plane at 10 nm on top of the HMM. The total simulated size of illumination pattern is 1 $\mu$m×1 $\mu$m. d $\theta$=0°, $\lambda$=500 nm, f $\theta$=0°, $\lambda$=600 nm. $\theta$ is the incident angle; $\lambda$ is the operating wavelength. G. Schematics of the experimental set-up of speckle-MAIN.
Figure 6:
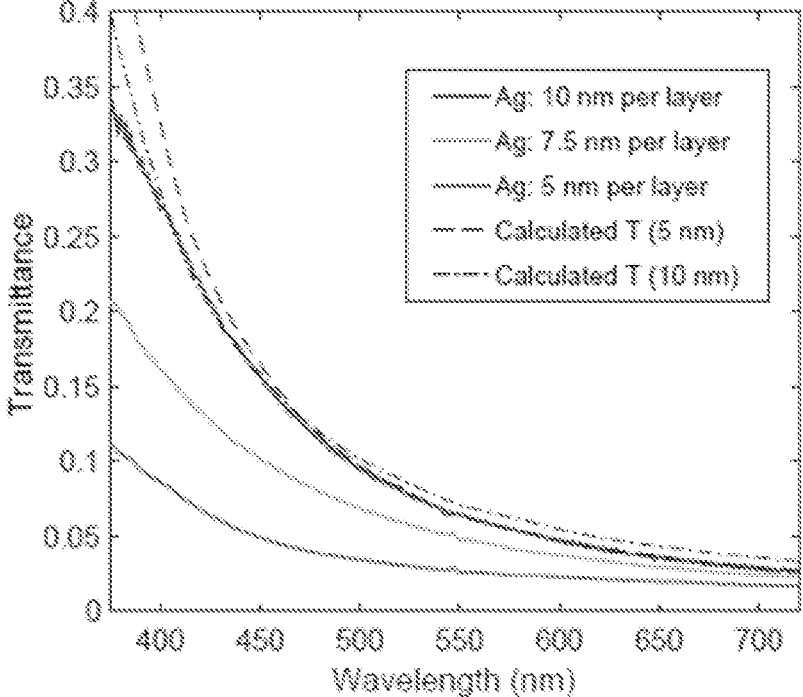
FIG. 6 depicts a graph illustrating the transmittance of a silver and silicon oxide (Ag—$SiO_2$) multilayer hyperbolic metamaterial (HMM) with different silver layer thickness. Blue solid: measured transmittance of 3 pairs of 10 nm Ag and 4 nm $SiO_2$. Yellow solid: measured transmittance of 4 pairs of 7.5 nm Ag and 3 nm $SiO_2$. Red solid: measured 6 pairs of 5 nm Ag and 2 nm $SiO_2$. Black dashed: calculated transmission of 6 pairs of 5 nm Ag and 2 mn $SiO_2$; Black dot-dashed: calculated transmission of 3 pairs of 10 nm Ag and 4 nm $SiO_2$

Referring now to FIG. 6, one example of a high effective refractive index structure may include a hyperbolic metamaterial multilayer such as three pairs of silver (Ag) and silicon oxide ($SiO_2$) layers. The hyperbolic metamaterial multilayer is deposited on a glass substrate, for example, by sputtering. FIG. 2 presents the characterization results of this high effective refractive index structure. For example, FIG. 2(a) shows a comparison of the optical transmission/reflection of the multilayer at normal incidence and the theoretical calculation using bulk material property. As shown, when the thickness of the silver film is below 10 nanometers, the transmission of the hyperbolic metamaterial multilayer drastically deviates from the calculated one, indicating a break in the continuity of the silver film. It should be appreciated that a thickness of 10 nanometer is selected to ensure the accuracy of the simulation by using bulk silver material properties in the following sections. Atomic force microscopy (AFM) is used to measure the top morphology of the deposited multilayer with the results shown in FIG. 2(b). The roughness (RMS) of the multilayer is ~1.1 nanometers, and the correlation length of the roughness is 35 nanometers. The transmission electron microscopy (TEM) image shown in FIG. 2(c) presents the well-formed continuous layers in the hyperbolic metamaterial multilayer. The non-perfect interface of these two amorphous thin films can also be observed.

To foresee the effect of small roughness on generating speckles, a full wave simulation modeling with measured film roughness is used. For example, the hyperbolic metamaterial multilayer may be excited using x-polarized plane wave with wavelength $\lambda$ and varying polar angle $\theta$. The speckles, represented by the field intensity distribution 10 nanometers away from the top surface of hyperbolic metamaterial (HMM) multilayer, are simulated with a series of wavelengths and incident angles. FIGS. 2(d) through 2(f) present three selected $|E|^2$ distributions at (500 nanometer, 0°); (500 nanometer, 45°) and (600 nanometer, 0°), respectively, demonstrating that the speckle has ultrahigh resolution and can be controlled by tuning either wavelength or incident angle/phase.

Figure 7:
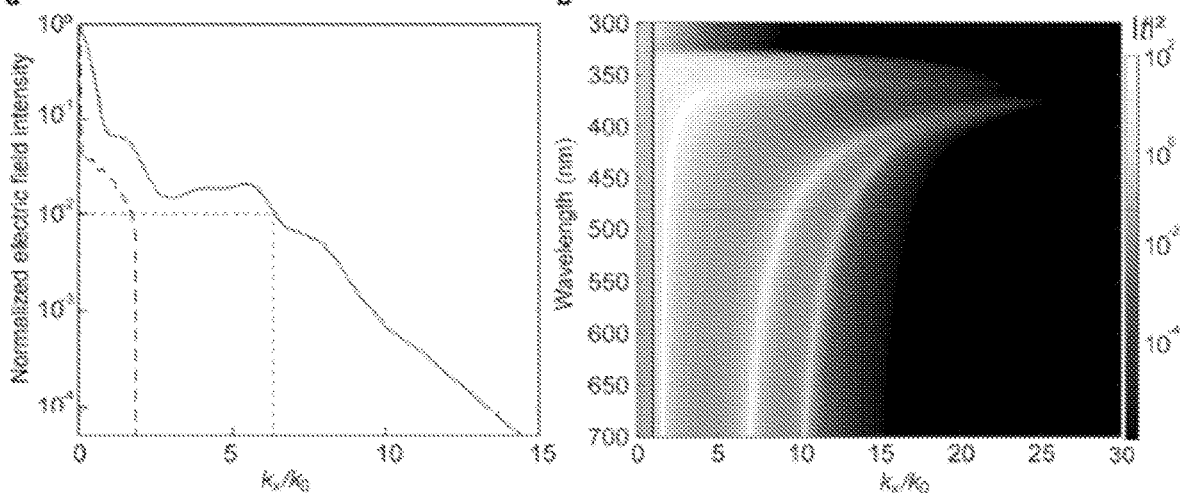
FIG. 7 depicts a Fourier transform of speckles 10 $\mu$m away from HMM (3 pairs of 10 nm Ag and 4 nm $SiO_2$ on glass) at $\lambda$=500 nm. $k_x$ stands for the spatial frequency of Fourier transform of intensity patterns. $k_x$ is normalized to the free space wave vector $k_o$. The black dashed line indicates the Fourier transform of speckles on glass. b Calculated optical transfer function (OTF, transmission, $|t|^2$) as a function of $k_x/k_o$.
Figure 8:
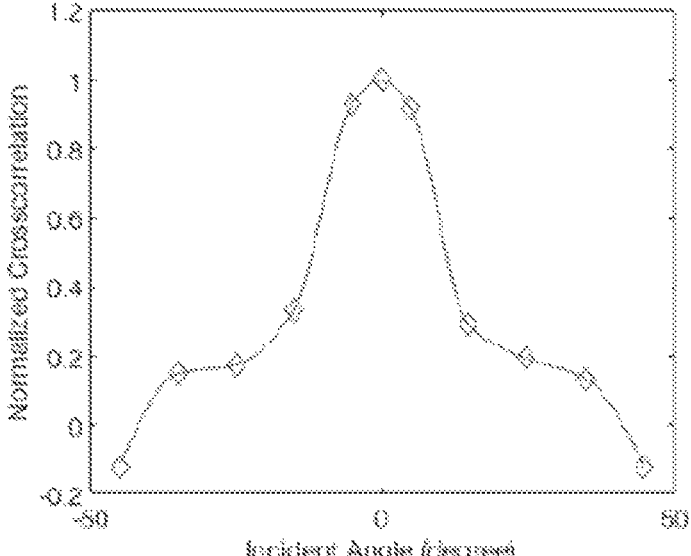
FIG. 8 depicts a normalized cross-correlation between speckles at different incident angles. The HMM (3 pairs of 10 nm Ag and 4 nm $SiO_2$ on glass) was used.

Two parameters of the speckle patterns are highly relevant to the structured illumination microscopy application: the spatial resolution of the speckles and the independence between different speckles. As shown in FIG. 7, the spatial resolution of the speckles may be analyzed based on the magnitude transfer function (MTF) of the $|E|^2$. Generally, a hyperbolic metamaterial (HMM) multilayer with thinner unit pair size will have speckles with higher-resolution. However, the unit pair size is limited by the minimum silver film thickness below which silver will become isolated islands instead of continuous films. Referring to FIG. 8, the independence between different speckles may be analyzed by the cross-correlation between the speckles. The correlation between speckles drops to 0.5 with ~15-degree incident angles difference when the operating wavelength is 488 nanometer.

Considering the illuminating system is a linear system with a complex electric field, the intensity distribution can be altered from the phase difference between beams that have different incident angles. To have enough distinguishable speckles, the hyperbolic metamaterial (HMM) multilayer may be illuminated with a random, diffraction-limited optical field generated by either a diffuser or a multimode fiber. The complex fields (diffraction-limited speckles), equal to a composite of plane waves at different angles and phases, will be converted into sub-diffraction-limited speckles after passing through the hyperbolic metamaterial (HMM) multilayer. At the sample plane, the high-resolution speckles excite the fluorophores in a specimen. The fluorescence signal is then directly collected by a standard inverted microscope system as shown in FIG. 2(g). Note that compared to a conventional structured illumination microscopy, speckle-MAIN can have comparable imaging speed per sub-frame. Illumination efficiency through the hyperbolic metamaterial (HMM) multilayer is about 15-20% at 488 nanometer, as shown in FIG. 2(a), which can be compensated by increasing laser power.

Figure 13:
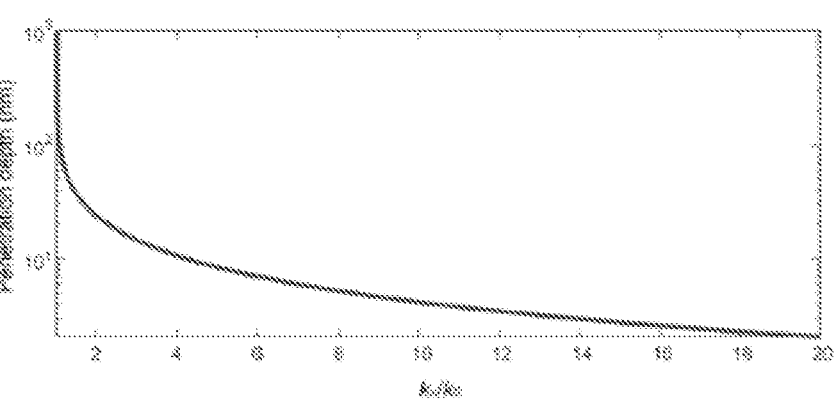
FIG. 13 depicts a graph illustrating an example of the relationship between penetration depth with respect to different illumination k.
Figure 14:
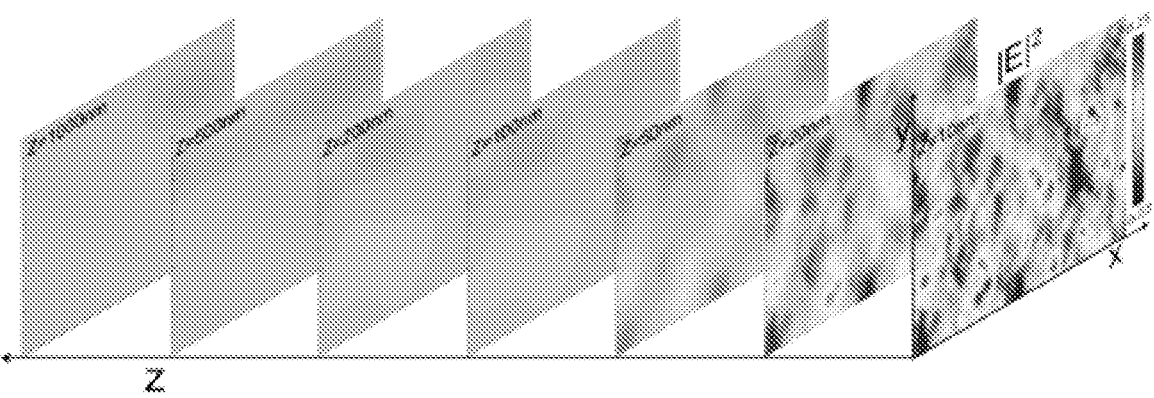
FIG. 14 depicts a z-location dependence of super-resolution speckle metamaterial-assisted illumination nanoscopy (speckle-MAIN) technique. FDTD calculated near field speckle intensity distributions are shown at 10 nm≤≤1000 nm. The windows are 1 $\mu$m×1 $\mu$m. The HMM (3 pairs of 10 nm Ag and 4 nm SiO$_2$) located at z=0 was used for the simulation. The maps are simulated for normal incident beam (θ=0°) at wavelength λ=500 nm. For comparison convenience, we showed all the intensity maps at the same color scale
Figure 15:
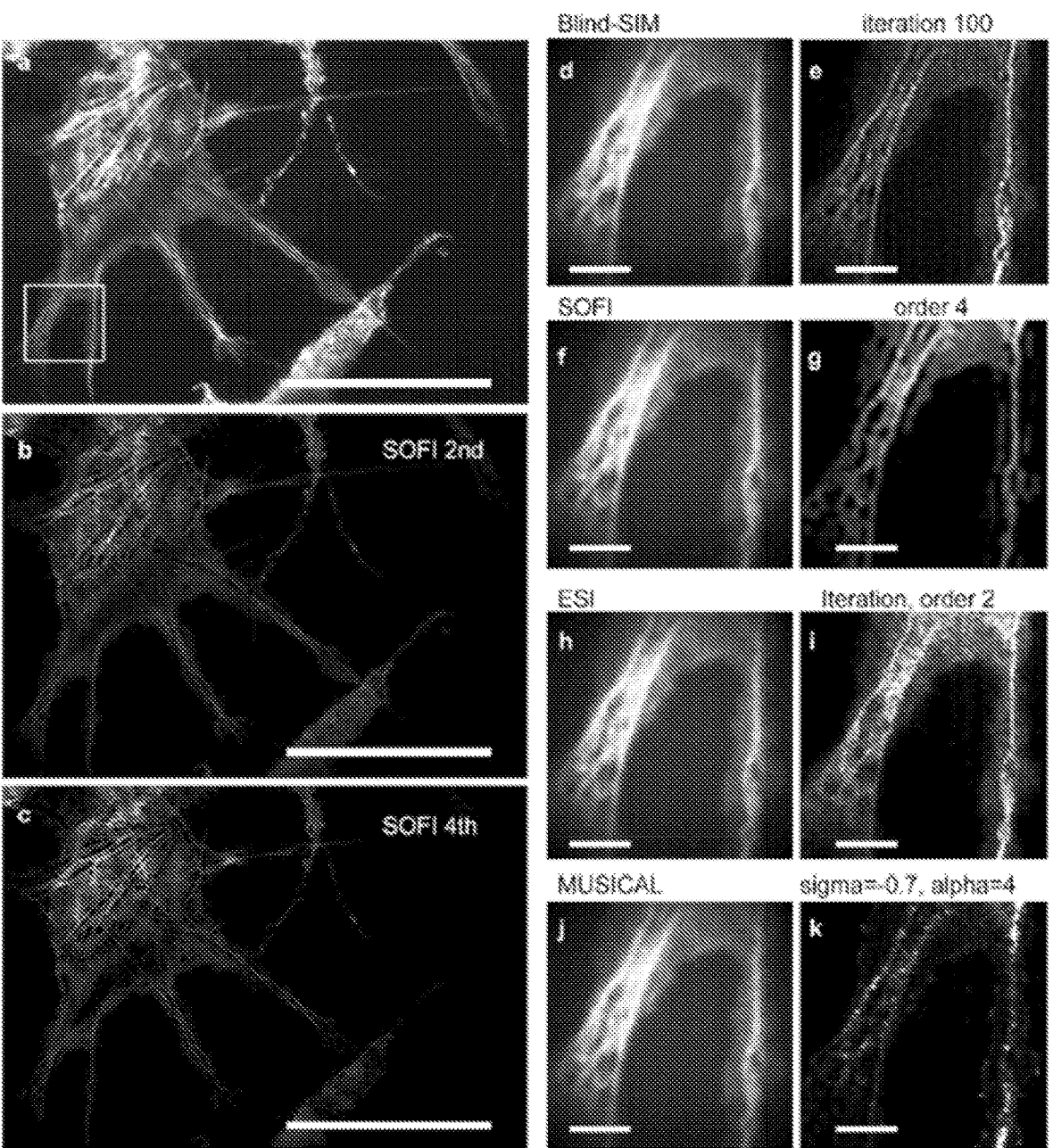
FIG. 15 depicts the results of a blind structured illumination microscopy (SIM), super-resolution optical fluctuation imaging (SOFI), electrical source imaging (ESI), and multiple signal classification algorithm (MUSICAL) reconstruction techniques. a. Diffraction limited image. Scale bar is 20 μm. b. SOFI reconstruction with second-other c. fourth-order. d, f, h, j. Zoom-in-view of the white box area in (a). e Blind-SIM reconstruction with iteration 100. g. SOFT reconstruction. i. ESI reconstruction results with second-order. K. MUSICAL reconstruction. Scale bar is 2 μm.

Since speckle-MAIN utilizes high resolution near field excitation for super-resolution, the excitation field intensity decreases exponentially with distance from the hyperbolic metamaterial (HMM) multiplayer. As shown in FIG. 13, the supported large wavevector speckle illumination patterns are sensitive to the distance to the surface of the hyperbolic metamaterial (HMM) multiplayer. In general, the closer an object resides to the surface of the hyperbolic metamaterial (HMM) multiplayer, the higher maximum resolution can be achieved as more high-k components of the illumination patterns will be utilized. This phenomenon is demonstrated in FIGS. 13 and 14.

Figure 9:
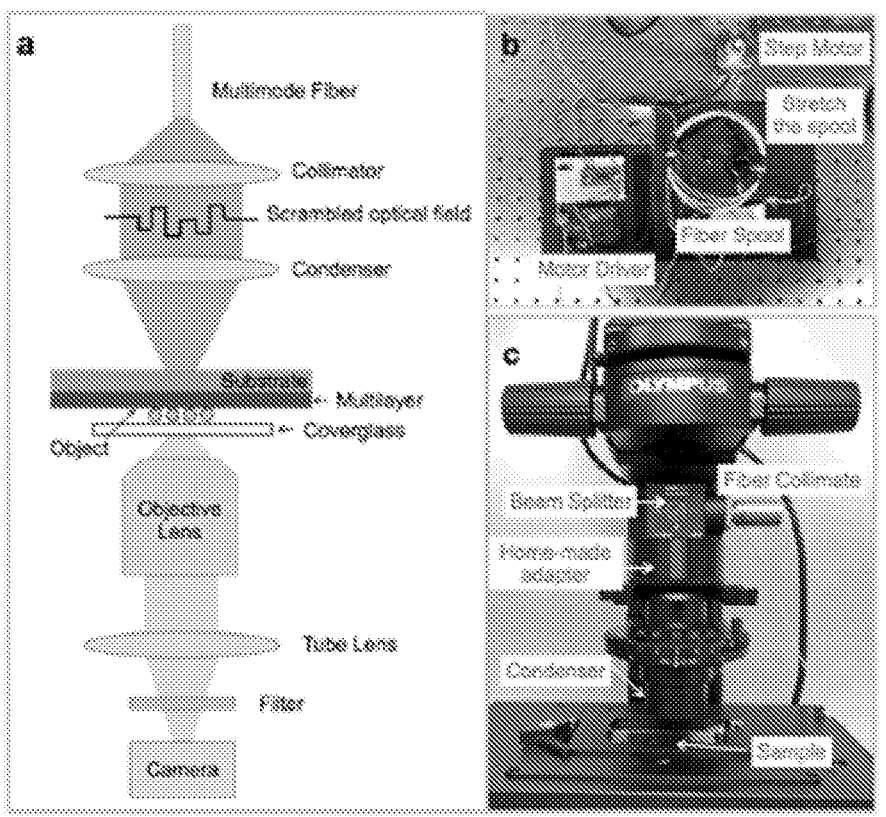
FIG. 9 an example of an optical instrument incorporating an example of a high effective refractive index material. A. Sketch of essential optical components. B. Speckle Generator based on multimode fiber. A laser beam is guided by the multimode.
Figure 10:
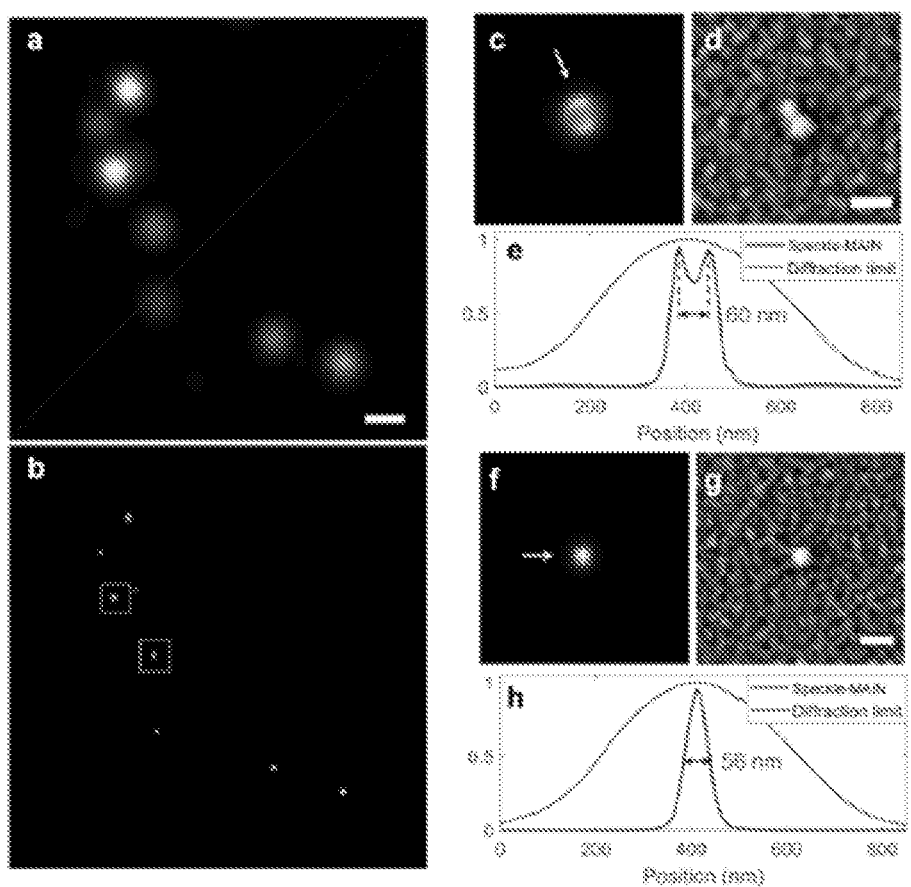
FIG. 10 depicts additional examples of images captured using a speckle metamaterial-assisted illumination nanoscopy (speckle-MAIN) technique with 0.8 NA and 80 subframes. a. Diffraction-limit Image. Scale bar: 600 nm. Objective lens: Zeiss 50×/0.8. b. Reconstructed Image. Number of raw camera frames: 80; Illumination wavelength: 450-480 nm. Step: 10 nm; Bandwidth: 10 nm. For each wavelength channel, 20 frames are acquired by changing the scrambled incident optical field. c-h. zoom in images of (b) at indicated location. d,g. SEM images of fluorescent beads at indicated locations. Scale Bar: 100 mu. e,h. Cross-section (normalized intensity) of image (c,f) along indicated direction.

To demonstrate the super-resolution capability of the proposed speckle-MAIN experimentally, sparsely distributed fluorescent beads (Fluoresbrite YG Carboxylate, ~46 nanometer in diameter) drop-casted on a high effective refractive index structure including a hyperbolic metamaterial (HMM) multilayer disposed on a substrate are imaged. A 488-nanometer continuous wave laser, directed by a multi-mode fiber, is incident on the other side of the hyperbolic metamaterial multilayer. The incident optical field is scrambled due to the multi-mode interference and can be changed by adding vibration to the fiber. The corresponding experimental method is shown in FIG. 2(g) while the setup is shown in FIG. 9. The incident field has a numerical aperture (NA) of ~0.2. Based on the simulation, the illumination pattern on the fluorescent beads will have much higher resolution after passing through the hyperbolic metamaterial (HMM) multiplayer.

Figure 3:
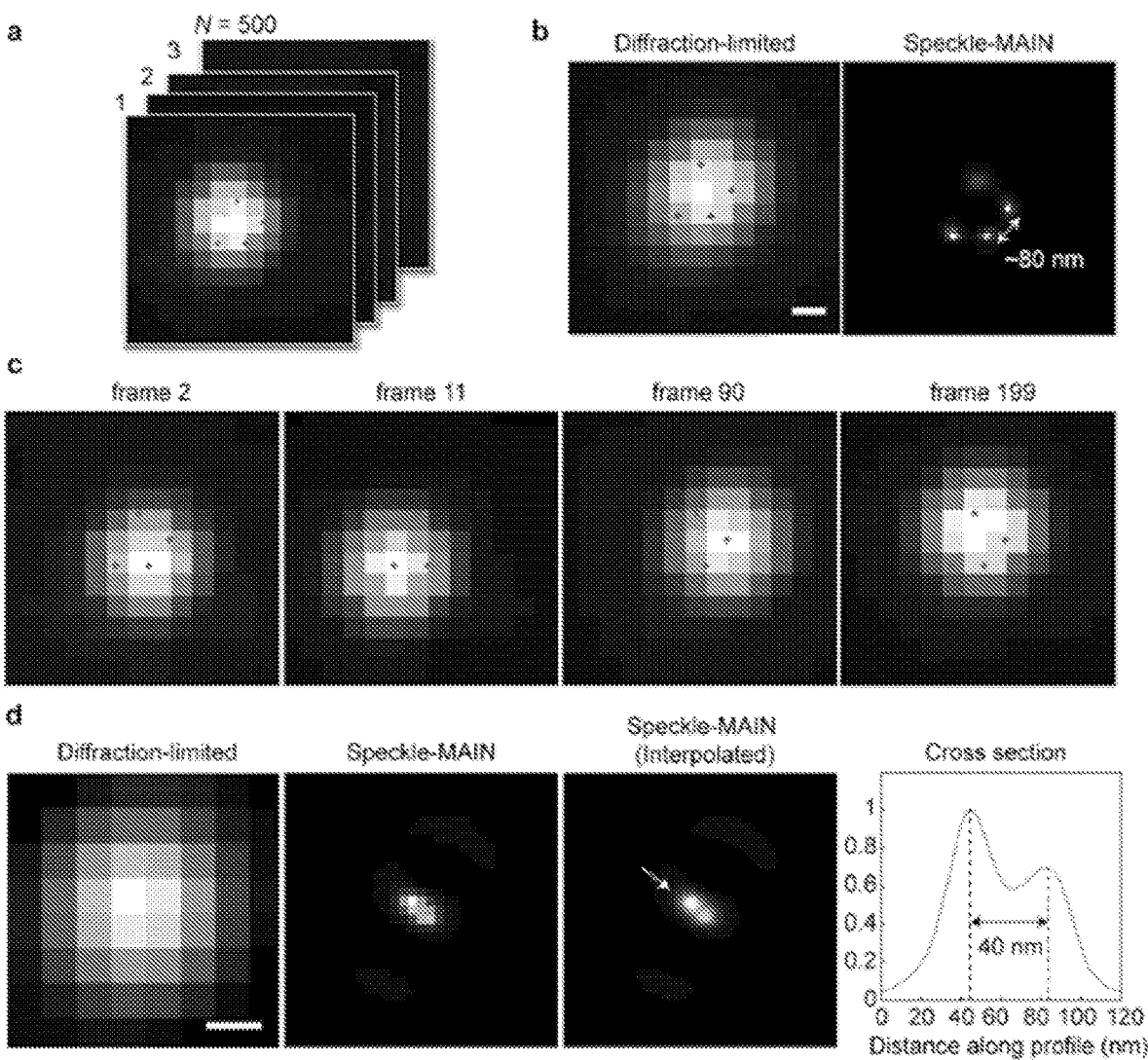
FIG. 3 depicts a demonstration of an example of super-resolution speckle metamaterial-assisted illumination nanoscopy (speckle-MAIN) technique. a. An intensity normalized image stack of fluorescent beads on HMM-coated substrate with different illumination condition. Objective lens: Olympus 100×/1.5 oil. Frame rate: 1 Hz. Exposure time: 500 ms. Total frame: 500. b. Diffraction-limited image and the reconstructed speckle-MAIN image. The speckle-MAIN image is reconstructed from 500 diffraction-limited frames. Pixel size: diffraction-limited, 65 nm; speckle-MAIN, 22 um. Locations of the reconstructed beads are marked in those raw frames. The diffraction-limited image is computed by averaging all 500 frames. Scale Bar: 100 nm. c. Four selected frames indicate a sub-diffraction changes of illumination pattern. d. Imaging of two close fluorescent beads shows speckle-MAIN resolution down to –40 nm. The cross section is plotted along the arrow direction in the interpolated speckle-MAIN image. Speckle-MAIN (interpolated) has 10 times interpolation from speckle-MAIN image. Pixel size: diffraction-limited, 65 nm; speckle-MAIN, 16 mil Scale bar: 100 nm.
Figure 16:
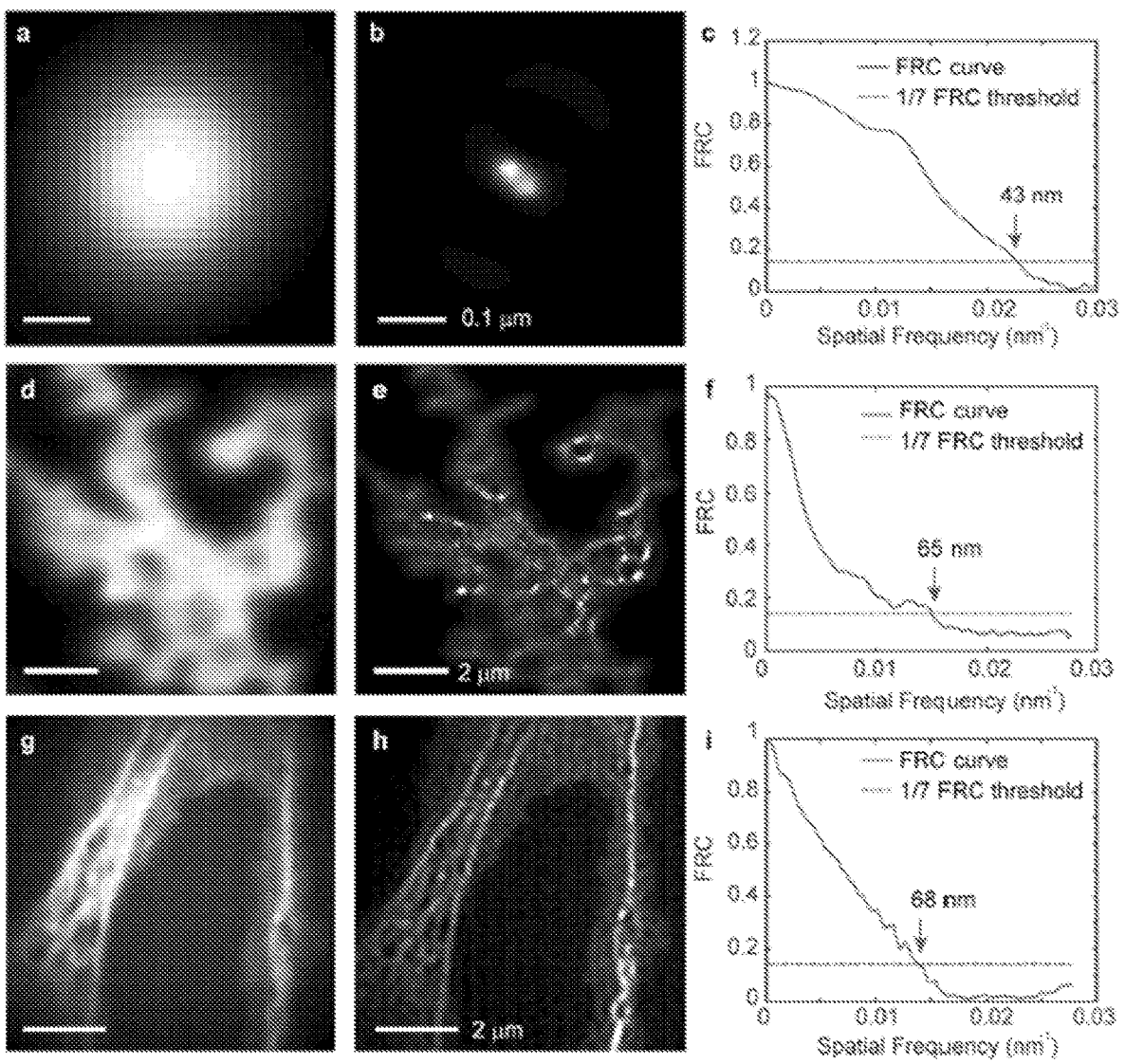
FIG. 16 depicts the standard ⅐ Fourier ring correlation (FRC) resolution criteria. a. Diffraction limited image and b. reconstructed image of two fluorescence beads (center to center distance 40 nm), c. FRC resolution criteria curve for the bead image. The standard ⅐ FRC resolution criteria illustrates 43 nm Fourier space cutoff with speckle-MAIN. d-f. are diffraction limited image, reconstructed image, and FRC curve of the aggregated Q-dot 605 sample, respectively. g-i. are diffraction limited image, reconstructed image, and FRC curve of the Cos-7 cell sample, respectively.
Figure 17:
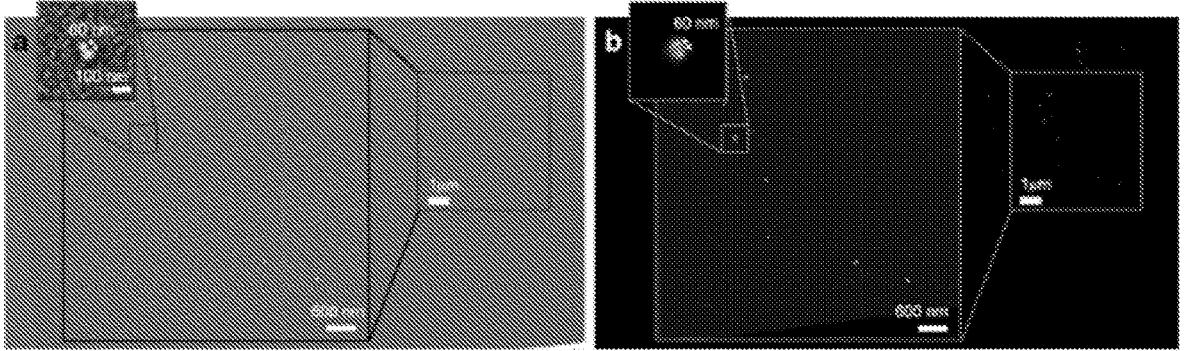
FIG. 17 depicts a comparison of a scanning electron microscope (SEM) image and a reconstructed super-resolution speckle metamaterial-assisted illumination nanoscopy (speckle-MAIN) image. a. SEM images of fluorescent beads. b. Reconstructed super-resolution speckle-MAIN image of the florescent beads.

FIGS. 3(a) and (c) present a few selected camera frames while incident optical field is changed randomly by the vibrating multimode fiber. The video is taken under a 100×/1.5 oil objective lens to maximize the detection numerical aperture (NA). Knowing that the sample is made of fluorescent spheres, the unsymmetrical look of the diffraction-limited image indicates the presence of multiple beads. The four selected raw camera frames shown in FIG. 3(c) present obvious peak location shifts during the acquisition, indicating the changes of illumination patterns at high-resolution. The super-resolution image in the right panel of FIG. 3(b) is reconstructed by using blind structured illumination microscopy (SIM) algorithms from all 500 frames. The super-resolution image resolves four well separated beads, with the closest two-bead spacing to be 80 nanometer. The location of the reconstructed four beads are marked on the raw frames, which agrees well with the peak intensity locations of those frames. Considering the low resolution of the far field incident light (NA ~0.2), the sub-diffraction changes of illuminating pattern is primarily caused by the substrate of the high effective refractive index structure. In a separate location shown in FIG. 3(d), a diffraction-limited spot is shown to include two touching fluorescent beads after the reconstruction. The center-to-center separation is measured to be 40 nanometer, demonstrating the speckle-MAIN's ultrahigh resolution capability. FIG. 16 depicts one example of a image-resolution measure, the Fourier ring correlation (FRC), that can be computed from the experimental data. The standard $\frac{1}{7}$ FRC resolution criteria illustrates 43 nanometer Fourier space cutoff with speckle-MAIN.

From an information theory point of view, at least $N^2$ sub-frames are needed to reconstruct a super resolution image with N-fold resolution improvement. Traditional structured illumination microscopy utilizes well known sinusoidal patterns to sample the object with high efficiency, so that a small number (e.g., close to $\alpha N^2$ where a denotes the oversampling factor) of sub-frames are involved. Speckle-based blind structured illumination microscopy (SIM), however, requires more frames owing to the lack of knowledge regarding exact illumination patterns and also the correlations between the illumination patterns. As shown in FIGS. 4(a) to (i), after reduction to 80 sub-frames, two particles with ~60 nanometer center-to-center distance can still be resolved using an objective with a numerical aperture of NA=0.8, indicating the robustness of the speckle-MAIN technology.

FIGS. 4(j) to (m) depict super-resolution images of a more complex object at a wide field of view. The object is made by a dense drop-casting of quantum dots emitting at 605 nanometers. The quantum dots form certain nanostructures on top of the high effective refractive index structure (e.g., a hyperbolic metamaterial (HMM) multilayer coated substrate). The super-resolution image reconstructed from 140 sub-frames reveals much greater details that cannot be observed by diffraction-limited images. In principle, speckle-MAIN has a field of view (FOV) as wide as an epi-fluorescent microscope, which is primarily limited by the camera sensor size. The standard $\frac{1}{7}$ Fourier ring correlation (FRC) resolution criteria shown in FIG. 16 illustrates a 65-nanometer Fourier space cutoff with speckle-MAIN.

Because bioimaging is an important application for super-resolution microscopy, the applicability of speckle-MAIN with biological samples are tested. For example, a thin (e.g., −10 nanometer) silicon oxide ($SiO_2$) protection layer with minimal defects may be disposed on top of the hyperbolic metamaterial (HMM) multilayer before cell growth to not only increase the biocompatibility of the high effective refractive index structure (e.g., the hyperbolic metamaterial (HMM) multilayer and substrate) but also reduce the quenching effect of the fluorescence dyes.

As shown in FIG. 5(a), Cos-7 cells transiently transfected with fluorescently labeled actin-binding Lifeact (Lifeact-Venus) are fixed and subjected to the speckle-MAIN measurement. For example, Cos7 (ATCC® CRL-1651) cells were cultured in Dulbecco modified Eagle medium (DMEM; Gibco) containing 4.5 g/L glucose and supplemented with 10% (v/v) fetal bovine serum (FBS, Sigma) and 1% (v/v) penicillin-streptomycin (Pen-Strep, Sigma-Aldrich). All cells were maintained in a humidified incubator at 37° C. with a 5% $CO_2$ atmosphere. 24 hours prior to transfection, cells were seeded onto hyperbolic metamaterial (HMM) multilayer coated substrate and grown to 50-70% confluence. Cells were then transfected with 100 ng of pcDNA3-Lifeact-Venus (Addgene plasmid #87613) using Lipofectamine 2000 (Invitrogen) and grown an additional 24 h before fixation. Cells were washed with Phosphate-buffered saline (PBS) before fixation with 4% paraformaldehyde and 0.2% glutaraldehyde PBS for 10 min at room temperature. Cells were quickly rinsed in PBS after fixation and quenched with freshly made 0.1% NaBH4 ice-cold PBS. After quenching, cells were washed three times for five minutes each with PBS on a shaker. Cells were imaged at room temperature and stored in PBS at 4° C.

Figure 5:
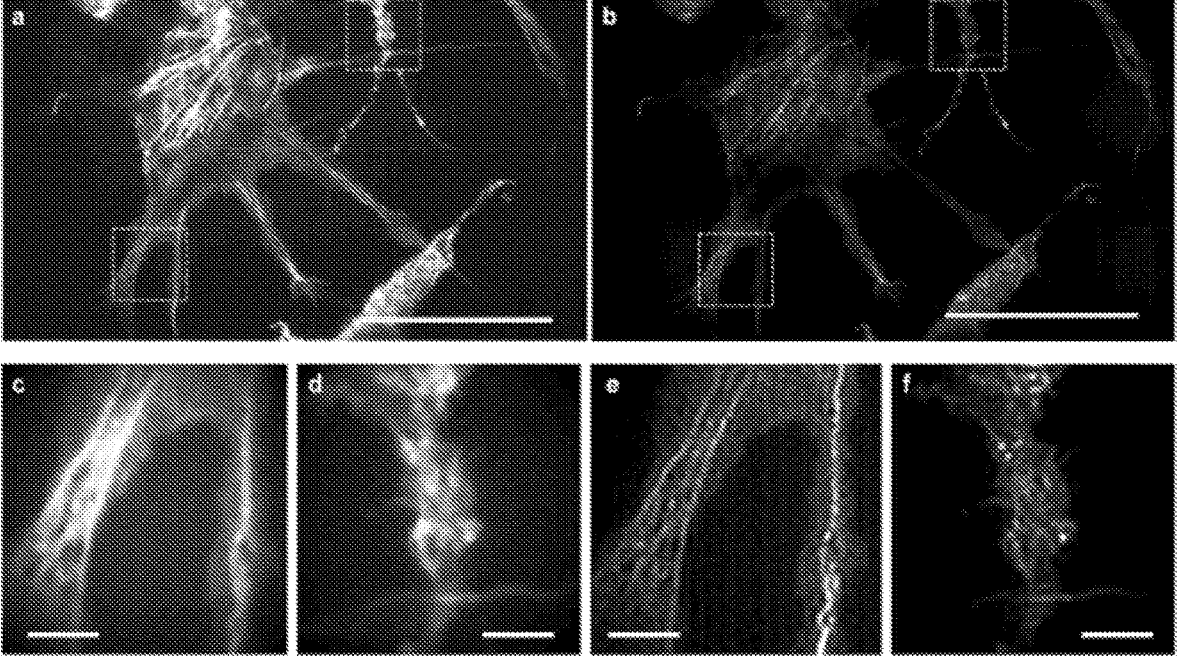
FIG. 5 depicts images of Cos-7 cells captured using a speckle metamaterial-assisted illumination nanoscopy (speckle-MAIN) technique. a. Diffraction-limited image. Scale bar: 20 $\mu$m. Objective lens: 40×/0.6 NA. b. Reconstructed speckle-MAIN image. c,d. Zoom-in view of the white box area in (a) e,f. Zoom-in view of the white box area in (b). Scale bar: $\mu$m.

Upon excitation with a 488-nanometer laser, 500 frames (1 frame per second) of the specimen are acquired by changing the scrambled incident optical field. In this case, a 200-millisecond exposure time and a 1-hertz frame rate are used in order to allot sufficient time for the multimode fiber to stabilize in FIG. 5. The fluorescent signal is collected by an objective lens (e.g., a 40×/0.6 numerical aperture Olympus objective) with proper emission filter (520/40 nanometer band-pass filter). A set of 200 frames are used for image reconstruction. Because all the metallic structures are embedded in glass, all the cell preparation processes for speckle-MAIN are identical to the case of using a conventional glass slide. The wide-field of view image reconstruction takes 10 minutes on a GTX1080Ti Graphic Card on a 17-8700K CPU Desktop to reconstruct an image with 100 by 100 raw pixels. FIGS. 5(c), (d), (e), and (f) present zoomed in images in the indicated regions for the diffraction-limited image and speckle-MAIN reconstruction correspondingly.

In the reconstructed image, the actin filaments are well resolved with fine features, which are not clearly discernible in the diffraction-limited image. In addition, some fragmented features, which might be induced by the interaction between the substrate of the high effective refractive index structure and fluorophores and/or substrate-dependent cell attachment, are present. This example indicates that the proposed speckle-MAIN technique can be directly applied to cell imaging without any modifications of the existing sample preparation protocols.

Figure 11:
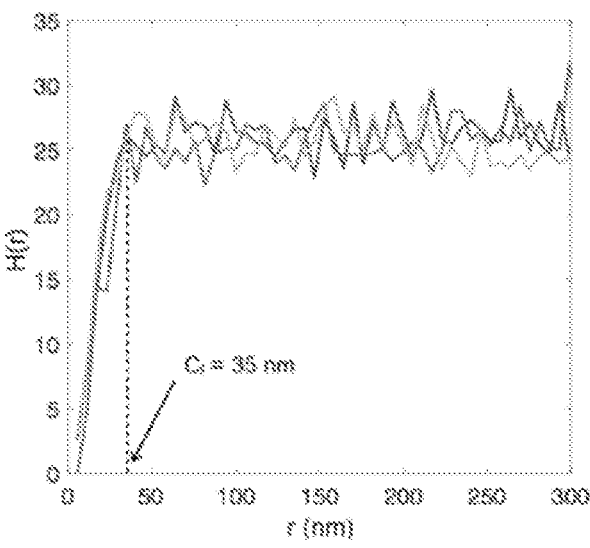
FIG. 11 depicts a graph illustrating a correlation length (CO measured from ATM heights (H(r)) mapping.
Figure 12:
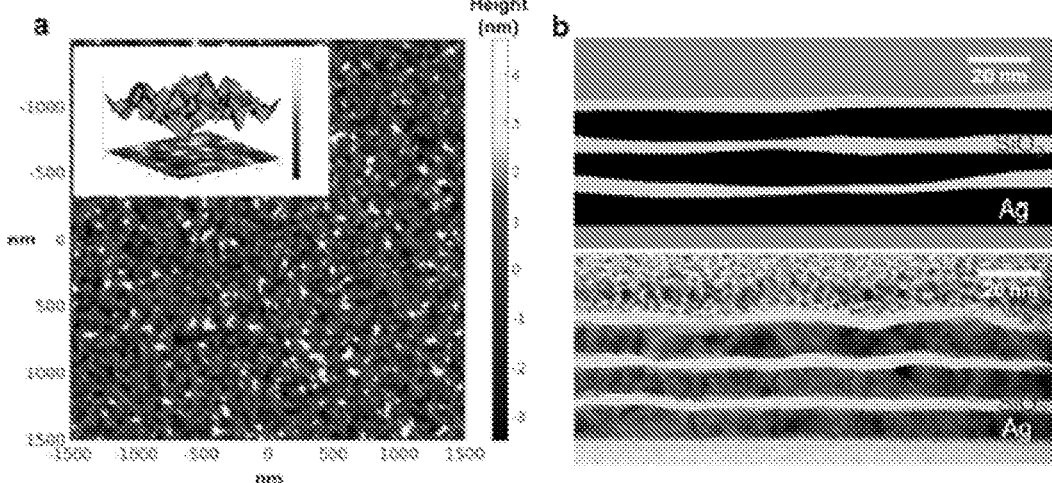
FIG. 12 depicts a simulated model of a rough surface with RMS=1.1 nm and correlation length of ~35 nm. a. The simulated top morphology of a rough interface between Ag and $SiO_2$. Inset: 3D drawing of the simulated interface; b. The side view of the simulated model compared to TEM measurement.

In some cases, the one or more high effective refractive index materials included in the high effective refractive index structure, such as the hyperbolic metamaterial (HMM) multiplayer, may exhibit a variety of physical conformations such as a non-flat or non-uniform surface. A non-flat hyperbolic metamaterial (HMI) multiplayer, such as a silver silicon oxide ($AgSiO_2$) multilayer may be simulated with the results of the simulations presented here based upon the solutions of coupled Maxwell's equations. Finite difference time domain (FDTD) method was employed using Lumerical software. In the simulation, it is sufficient to excite the hyperbolic metamaterial (HMI) using an x-polarized electromagnetic plane wave with wavelength $\lambda$ and varying polar angle $\emptyset$ in order to observe the speckle pattern changes. Local bulk dielectric functions of silver (Ag) may be incorporated while the refractive index of silicon oxide ($SiO_2$) was chosen to be equal to 1.46. The background was chosen as air like in experiment. To consider the non-flat or random rough surface, it is important to model the rough surfaces accurately to describe the main characteristics observed in the sample. Topographic features of a random rough surface are characterized mainly by a root mean square (RMS) as a measure of the magnitude of varying height and correlation length ($C_l$) in two dimensions where the surface is defined. Based upon the measurement shown in FIGS. 11-12, a root mean square of 1.1 nanometers and a correlation length $C_l$ of 35 nanometers were chosen to model a random rough surfaces. FIG. 12 shows a comparison a code-generated rough surface and a measured one. After the hyperbolic metamaterial (HMM) multilayer is excited by the incident light, the speckle intensity distribution is calculated at 10 nanometer above the top surface of the structure.

Figure 4:
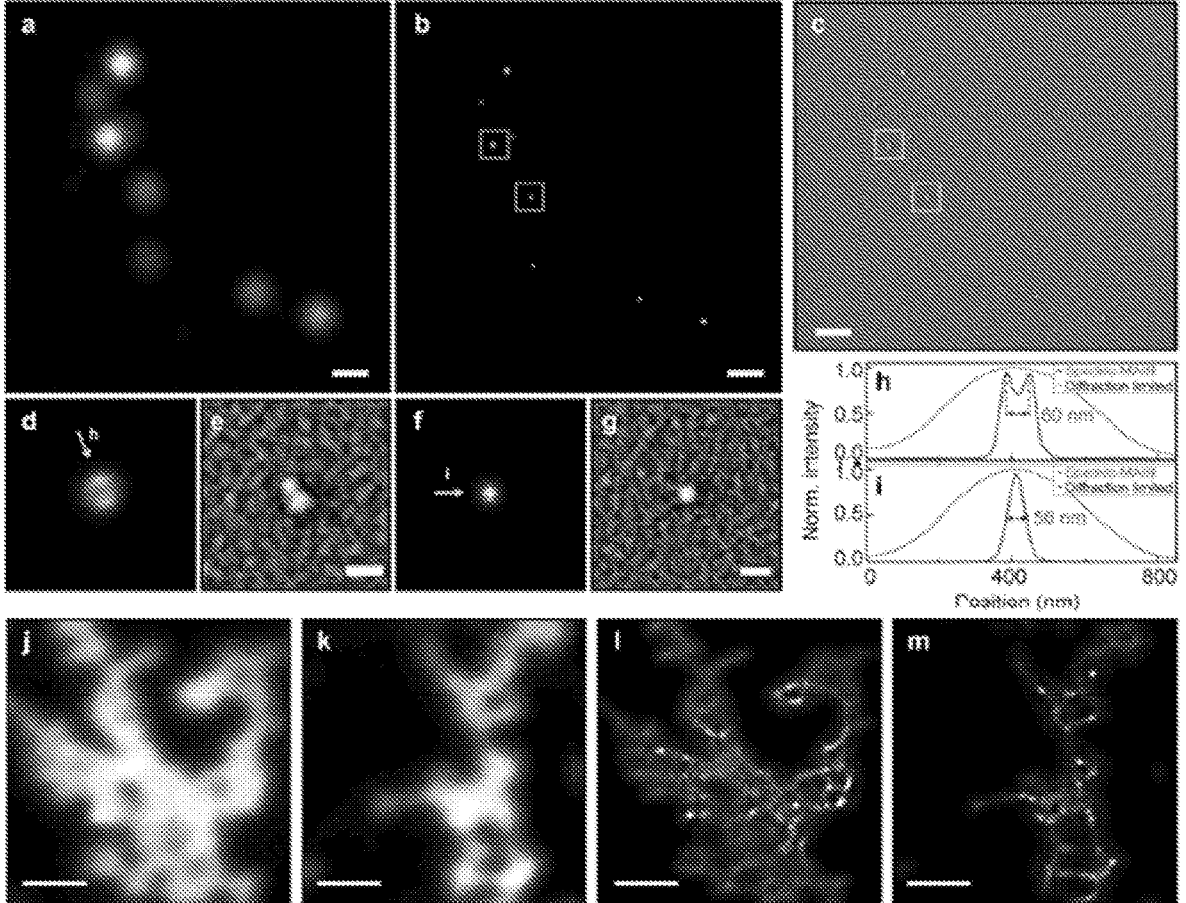
FIG. 4 depicts examples of images captured using a speckle metamaterial-assisted illumination nanoscopy (speckle-MAIN) technique. a. Diffraction-limited image of fluorescent beads. b. Reconstructed speckle-MAIN image. c. SEM image. Scale bar: 600 nm. d-g. zoomed-in images (b) and (c) of fluorescent beads. Scale bar: 100 nm. h,i. Normalized intensity cross-section (red curves) of images (d,f) along indicated direction. Black curves show the corresponding intensity cross-section of conventional wide-field images. j,k. Diffraction-limited image. Objective lens: 50×10.8 NA. 1,m. Reconstructed speckle-MAIN image of Qdot 605. Scale bar: 2 $\mu$m. Exposure time: 200 ms, frame rate: 1 fps.

For various simulations, a 488-nanometer laser (Coherent Genesis MX488-1000 STM) is coupled into a multimode fiber (Thorlabs, core diameter: 50 μm, NA 0.22). The other end of the fiber is coupled to a reflective fiber collimator that is attached to a custom-made adapter of the microscope condenser. This setup is shown in FIG. 9. The fiber end is imaged to the high effective refractive index structure (e.g., a hyperbolic metamaterial (HMM) multilayer coated substrate), projecting diffraction-limited speckle patterns. The typical delivered laser intensity onto the high effective refractive index structure is around $10^3$ W/cm$^2$. The high effective refractive index structure (e.g., the hyperbolic metamaterial (HMM) multilayer coated substrate) converts the pattern into high-resolution speckles that illuminates the object on the other side. The high effective refractive index structure (e.g., the hyperbolic metamaterial (HMI) multilayer coated substrate) exhibits a transmission of ~15% at 488 nanometers and ~30% at 405 nanometers. The speckle is controlled by a step motor which will stretch the fiber spool during image acquisition. In FIG. 4, an additional 2× magnification is used at the image plane. A scientific complementary metal-oxide-semiconductor (sCMOS) camera is used for imaging acquisition (Hamamatsu Orca Flash 4.0 v3)

Image processing and reconstruction may be performed in MATLAB. The iterative reconstruction algorithm blind Structured illumination microscopy (SIM), which does not require exact knowledge of the illumination pattern, may be used to retrieve the object information. For blind structured illumination microscopy (SIM), an assumption is made that all illumination patterns add up to a uniform pattern. Both the object and the illumination patterns are treated as unknowns in real space and are solved using a cost-minimization strategy. Each super-resolution frame is reconstructed from multiple sub-frames (80-500 frames) that were illuminated under different speckle patterns. The graphics processor unit (GPU) based reconstruction for an image size of 200×200 pixels typically takes 10-30 minutes on a Nvidia GTX 1080 Ti.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:
1. An apparatus, comprising:
a high effective refractive index structure including one or more high effective refractive index materials disposed on a substrate, the high effective refractive index structure configured to respond to a light received at the high effective refractive index structure by at least generating one or more sub-diffraction limit illumination patterns for illuminating a specimen while one or more frames are captured of the illuminated specimen, wherein the one or more high effective refractive index materials exhibit an effective refractive index equal to or greater than 3 and include a hyperbolic metamaterial (HMM) multilayer.
2. The apparatus of claim 1, wherein the one or more sub-diffraction limit illumination patterns include one or more speckle patterns.
3. The apparatus of claim 1, wherein the hyperbolic metamaterial multilayer includes one or more pairs of a first material coupled with a second material.
4. The apparatus of claim 3, wherein the hyperbolic metamaterial multilayer comprises one or more pairs of a metal layer coupled with a dielectric layer.
5. The apparatus of claim 3, wherein the hyperbolic metamaterial multilayer comprises a silver (Ag) and silicon dioxide (SiO$_2$) multilayer.

6. The apparatus of claim 1, wherein the one or more high effective refractive index materials include a nanowire based hyperbolic metamaterial (HMM).

7. The apparatus of claim 1, wherein the one or more high effective refractive index materials include an organic hyperbolic material (OHM).

8. The apparatus of claim 7, wherein the organic hyperbolic material comprises regioregular poly(3-hexylthiophene-2,5-diyl) (P3HT).

9. The apparatus of claim 1, further comprising a light source configured to output the light, and wherein the light source comprises at least one of a laser, a light emitting diode (LED), or a lamp.

10. The apparatus of claim 9, further comprising one or more mechanisms configured to direct, to the high effective refractive index structure, at least a portion of the light output by the light source.

11. The apparatus of claim 10, wherein the one or more mechanisms include at least one of a multimode fiber or a spatial light modulator.

12. The apparatus of claim 1, further comprising an image sensor configured to generate the one or more frames of the illuminated specimen.

13. The apparatus of claim 12, wherein the image sensor includes a light detector configured to at least one of detect light transmitted through the illuminated specimen or detect light reflected from the illuminated specimen.

14. The apparatus of claim 12, wherein the image sensor comprises one or more of active pixel sensors, charge-coupled devices (CCD), radiation detectors, infrared detectors, light emitting diodes, photoresistors, photodiodes, phototransistors, pinned photodiodes, quantum dot photoconductors or photodiodes, semiconductor detectors, silicon drift detectors (SDD), a complementary metal-oxide-semiconductor (CMOS) camera, a scientific complementary metal-oxide-semiconductor (sCMOS) camera, and a photomultiplier tube (PMT) array.

15. An apparatus, comprising:
a high effective refractive index structure including one or more high effective refractive index materials disposed on a substrate, the high effective refractive index structure configured to respond to a light received at the high effective refractive index structure by at least generating one or more sub-diffraction limit illumination patterns for illuminating a specimen while one or more frames are captured of the illuminated specimen, wherein the one or more high effective refractive index materials exhibit an effective refractive index equal to or greater than 3 and include a hyperbolic metamaterial (HMM) multilayer;
a light source configured to output the light received at the high effective refractive index structure; and
an image sensor configured to generate the one or more frames of the illuminated specimen.

16. The apparatus of claim 15, wherein the one or more sub-diffraction limit illumination patterns include one or more speckle patterns.

17. A method, comprising:
generating, by a high effective refractive index structure including one or more high effective refractive index materials disposed on a substrate, one or more sub-diffraction limit illumination patterns, the high effective refractive index structure generating the one or more sub-diffraction limit illumination patterns in response to a light received at the high effective refractive index structure, wherein the one or more high effective refractive index materials exhibit an effective refractive index equal to or greater than 3 and include a hyperbolic metamaterial (HMM) multilayer;
illuminating a specimen with the one or more sub-diffraction limit illumination patterns; and
capturing one or more frames of the illuminated specimen.

18. The method of claim 17, further comprising:
applying, using at least one data processor, a reconstruction technique to generate, based at least on the one or more frames, one or more images of the specimen, the reconstruction technique including at least one of a deep learning model, blind structured illumination microscopy (blind-SIM), super-resolution optical fluctuation imaging (SOFI), electrical source imaging (ESI), or multiple signal classification algorithm (MUSICAL).

* * * * *